United States Patent
Kageyama

(10) Patent No.: US 8,809,442 B2
(45) Date of Patent: Aug. 19, 2014

(54) RESIN COMPOSITION

(75) Inventor: Yuichi Kageyama, Kanagawa (JP)

(73) Assignee: Ajinomoto Co., Inc., Tokyo (JP)

( * ) Notice: Subject to any disclaimer, the term of this patent is extended or adjusted under 35 U.S.C. 154(b) by 0 days.

(21) Appl. No.: 13/474,119

(22) Filed: May 17, 2012

(65) Prior Publication Data

US 2012/0283375 A1    Nov. 8, 2012

Related U.S. Application Data

(63) Continuation of application No. PCT/JP2010/070404, filed on Nov. 16, 2010.

(30) Foreign Application Priority Data

Nov. 18, 2009 (JP) ................................. 2009-263414

(51) Int. Cl.
*C08L 37/00* (2006.01)
*C08K 5/00* (2006.01)
*C09B 67/00* (2006.01)
*C08G 18/42* (2006.01)

(52) U.S. Cl.
USPC ............ 524/517; 524/500; 524/502; 524/515

(58) Field of Classification Search
USPC .......................... 524/430, 500, 502, 515, 517
See application file for complete search history.

(56) References Cited

U.S. PATENT DOCUMENTS

| | | | |
|---|---|---|---|
| 4,218,349 A * | 8/1980 | Minatono et al. | 525/207 |
| 2006/0100299 A1 * | 5/2006 | Malik et al. | 522/31 |
| 2009/0026934 A1 | 1/2009 | Fujita et al. | |
| 2011/0105637 A1 | 5/2011 | Fujita et al. | |

FOREIGN PATENT DOCUMENTS

| | | |
|---|---|---|
| EP | 1 674 432 A1 | 6/2006 |
| JP | 56-136833 | 10/1981 |
| JP | 08-157700 | 6/1996 |
| JP | 2005-306946 | 11/2005 |
| JP | 2006-070151 | 3/2006 |
| JP | 2008-248055 | 10/2008 |
| JP | 2009-524705 | 7/2009 |
| JP | 2010-270309 | 12/2010 |
| JP | 2011-526629 | 10/2011 |
| WO | 2007/087281 A1 | 8/2007 |

OTHER PUBLICATIONS

International Search Report issued in PCT/JP2010/070404 issued Feb. 15, 2011.
European Search Report issued in EP patent application No. 10831561.5 dated Mar. 31, 2014.

* cited by examiner

*Primary Examiner* — Angela C Scott

(74) *Attorney, Agent, or Firm* — Oblon, Spivak, McClelland, Maier & Neustadt, L.L.P.

(57) ABSTRACT

Resin compositions containing a polyisobutylene resin; a polyisoprene resin and/or a polyisobutylene resin, each having a functional group capable of reacting with an epoxy group; a tackifier resin; and an epoxy resin are useful for sealing OEDs.

17 Claims, No Drawings

RESIN COMPOSITION

CROSS REFERENCES TO RELATED APPLICATIONS

This application is a continuation of International Patent Application No. PCT/JP2010/070404, filed on Nov. 16, 2010, and claims priority to Japanese Patent Application No. 2009-263414, filed on Nov. 18, 2009, both of which are incorporated herein by reference in their entireties.

BACKGROUND OF THE INVENTION

1. Field of the Invention

The present invention relates to resin compositions that can be preferably used for sealing and the like of an OLED (organic light emitting diode) device.

2. Discussion of the Background

An OLED (organic light emitting diode) device is a luminescent device using an organic substance as a luminescence material, and is a material attracting attention in recent years since it can provide high brightness luminescence at a low voltage. However, OLED (organic light emitting diode) devices are extremely vulnerable to moisture, and are associated with problems in that the organic material itself is deteriorated by moisture to show decreased luminance, fail to emit light, the interface between electrode and OLED (organic light emitting diode) layer is detached by the influence of moisture, and the metal is oxidized to have high resistance.

When a thermoset resin composition is used as a whole surface sealing material, advantages are that lamination work is easy since material viscosity is low before curing, and water vapor transmission of a cured product after thermal curing is low. On the other hand, however, an OLED (organic light emitting diode) device is problematically degraded by a heating temperature for thermal curing.

JP-A-2009-524705 discloses a sealing film comprising a polyisobutylene resin and a hydrogenated cyclic olefin based polymer. While the film is generally laminated with a protective film, since the film has a high tackiness, the protective film is difficult to detach, and the handling is extremely difficult since it is markedly deformed during detachment and the like.

On the other hand, JP-A-2008-248055 discloses a composition for a sealing material, which contains an isobutylene polymer an epoxy group-containing compound, and a curing agent for epoxy resin. However, since this composition requires hot-melt application, a sheet cannot be produced conveniently like a varnish coating. In addition, JP-A-2008-248055 is silent in regard to adhesion and handling properties, and sufficient consideration has not been conducted.

Thus, there remains a need for resin compositions that can be used for sealing and the like of an OLED (organic light emitting diode) device which do not suffer from the above-discussed drawbacks.

SUMMARY OF THE INVENTION

Accordingly, it is one object of the present invention to provide novel resin compositions that can be used for sealing and the like of an OLED (organic light emitting diode) device.

It is another object of the present invention to provide such novel resin compositions that permits varnish coating.

It is another object of the present invention to provide such novel resin compositions which can be conveniently made into a sheet.

It is another object of the present invention to provide such novel resin compositions which do not require thermal curing after a sealing step since it is cured in advance before the sealing step.

It is another object of the present invention to provide such novel resin compositions which can drastically reduce heat degradation of OLED (organic light emitting diode) device.

It is another object of the present invention to provide such novel resin compositions which can realize a sheet superior in resistance to moisture permeability, adhesion strength and handling property.

It is another object of the present invention to provide novel resin composition sheets obtained from such a resin composition.

It is another object of the present invention to provide novel methods of preparing an OLED (organic light emitting diode) device by sealing an OLED (organic light emitting diode) device with such a resin composition.

It is another object of the present invention to provide novel OLED (organic light emitting diode) devices which have been prepared by such a method.

These and other objects, which will become apparent during the following detailed description, have been achieved by the inventors' discovery that resin compositions containing a polyisobutylene resin, a polyisoprene resin and/or a polyisobutylene resin, each having a functional group capable of reacting with an epoxy group, a tackifier resin, and an epoxy resin, are useful for sealing and the like of an OLED (organic light emitting diode) device.

Accordingly, the present invention includes the following embodiments.

(1) A resin composition, comprising:
(A) a polyisobutylene resin,
(B) a polyisoprene resin and/or a polyisobutylene resin, each having a functional group capable of reacting with an epoxy group,
(C) a tackifier resin, and
(D) an epoxy resin.

(2) The resin composition of the above-mentioned (1), wherein the functional group of (B) is an acid anhydride group.

(3) The resin composition of the above-mentioned (1), wherein (A) a polyisobutylene resin is a copolymer wherein a segment backbone comprised of a monomer component other than isobutylene is copolymerized with an isobutylene polymer and/or a polyisobutylene backbone.

(4) The resin composition of the above-mentioned (1), wherein (A) a polyisobutylene resin is a copolymer wherein a segment backbone comprised of a monomer component of styrene is copolymerized with a polyisobutylene backbone.

(5) The resin composition of the above-mentioned (1), further comprising (E) liquid polyisobutylene and/or liquid polyisoprene.

(6) The resin composition of the above-mentioned (1), further comprising (F) an inorganic filler.

(7) The resin composition of the above-mentioned (1), further comprising (G) hygroscopic metal oxide.

(8) The resin composition of the above-mentioned (1), further comprising (H) a curing agent.

(9) A resin composition sheet comprising the resin composition of any of the above-mentioned (1)-(8).

(10) The resin composition sheet of the above-mentioned (9), which is cured in advance before a sealing step of an OLED (organic light emitting diode) device and is used to cover the OLED (organic light emitting diode) device.

(11) An OLED (organic light emitting diode) device comprising the resin composition sheet of the above-mentioned (9).

(12) A production method of an OLED (organic light emitting diode) device, comprising previously curing the resin composition sheet of the above-mentioned (9) before a sealing step comprising laminating the sheet on a substrate.

13) A resin composition sheet, comprising:
(A) a polyisobutylene resin,
(B) a polyisoprene resin and/or a polyisobutylene resin, each having a functional group capable of reacting with an epoxy group,
(C) a tackifier resin, and
(D) an epoxy resin,
which is cured in advance before a sealing step of an OLED (organic light emitting diode) device and capable of reducing heat degradation of the OLED (organic light emitting diode) device.

By using a resin composition containing a polyisobutylene resin, a polyisoprene resin and/or a polyisobutylene resin, each having a functional group capable of reacting with an epoxy group, a tackifier resin, and an epoxy resin, a sheet that permits varnish coating, can be conveniently made into a sheet, does not require thermal curing after a sealing step since it is cured in advance before the sealing step, can drastically reduce heat degradation of OLED (organic light emitting diode) device, and can realize a sheet superior in resistance to moisture permeability, adhesion strength and handling property can be provided.

DETAILED DESCRIPTION OF THE PREFERRED EMBODIMENTS

The major characteristic of the resin composition of the present invention is that it contains (A) a polyisobutylene resin, (B) a polyisoprene resin and/or a polyisobutylene resin, each having a functional group capable of reacting with an epoxy group, (C) a tackifier resin, and (D) an epoxy resin.

(A) Polyisobutylene Resin.

The (A) polyisobutylene resin used in the present invention (hereinafter to be also abbreviated as "component (A)") has an action to improve the resistance of the resin composition to moisture permeability as well as stably maintain various other properties. The (A) polyisobutylene resin is free of a functional group capable of reacting with an epoxy group and preferably in a solid state at room temperature (25° C.).

The component (A) is not limited to a homopolymer of isobutylene or a copolymer wherein an appropriate amount of an olefinic compound such as butene-1, butene-2, and the like is copolymerized with isobutylene (hereinafter these are generically referred to as "isobutylene polymer") as long as it is a polymer mainly formed on polyisobutylene backbone, and may be a copolymer (block copolymer or graft copolymer) wherein a segment backbone comprised of a monomer component other than isobutylene is copolymerized with a polyisobutylene backbone as long as desired resistance to moisture permeability can be obtained. Examples of the monomer component other than isobutylene in the copolymer include isoprene, styrene, butadiene, ethylene, propylene, acrylonitrile, vinyl chloride, vinyl bromide, hydrogenated styrene, pentadiene, cyclopentadiene, dicyclopentadiene, and the like, and one or more kinds of these can be used. Of these, styrene is preferable from the aspects of improvement of hyperthermic resistance and improvement of resistance to moisture permeability. In the copolymer, the proportion of the polyisobutylene backbone is preferably not less than 50 mass %, more preferably not less than 60 mass %, of the whole polymer. A preferable copolymer composition (polyisobutylene backbone/a segment backbone comprised of a monomer component other than isobutylene) is 60-90 mass %/10-40 mass %, more preferably 65-80 mass %/20-35 mass %. The copolymer may be used in combination with an isobutylene polymer.

Specific examples of component (A) in commercial products include Oppanol B12, B15, B50, B80, B100, B120, B150, B220 (manufactured by BASF), JSRbutyl065, 268, 365 (manufactured by JSR Corporation), Vistanex LM-MS, MH, H, MML-80, 100, 120, 140 (manufactured by Exxon Chemical), HYCAR (manufactured by Goodrich Corporation), SIBSTAR T102 (manufactured by Kaneka Corporation) and the like. One or more kinds of these may be used in combination.

While the average molecular weight of component (A) is not particularly limited, the viscosity average molecular weight is preferable not more than 1,200,000, more preferably not more than 1,100,000, further preferably not more than 1,000,000, to achieve good coating property and good compatibility. On the other hand, the viscosity average molecular weight is preferably not less than 100,000, more preferably not less than 200,000, further preferably not less than 300,000, to prevent cissing during coating of a resin composition, express resistance of the resin composition sheet to moisture permeability, and improve mechanical strength. Component (A) is preferably in a solid state at room temperature (25° C.). The viscosity average molecular weight in the present invention is determined according to a conventional method by measuring the viscosity of a diluted polymer solution at a given temperature and from a viscosity formula and using the obtained value of intrinsic viscosity. Alternatively, it can also be determined by the Florey's equation of molten viscosity from the molten viscosity of the resin.

One or more kinds can be used for component (A). While the content of component (A) in the resin composition is not particularly limited, it is preferably not more than 60 mass %, more preferably not more than 50 mass %, further preferably not more than 40 mass %, still more preferably not more than 30 mass %, especially preferably not more than 25 mass %, relative to 100 mass % of a non-volatile component in the resin composition, since good coating property and good compatibility can be achieved, and good hyperthermic resistance and good handling property (suppression of tackiness) can be ensured. On the other hand, it is preferably not less than 1 mass %, more preferably not less than 2 mass %, further preferably not less than 3 mass %, still more preferably not less than 5 mass %, especially preferably not less than 10 mass %, particularly preferably not less than 15 mass %, relative to 100 mass % of a non-volatile component in the resin composition, since necessary resistance to moisture permeability can be achieved.

(B) Polyisoprene Resin and/or Polyisobutylene Resin, Each Having a Functional Group Capable of Reacting with an Epoxy Group.

The (B) polyisoprene resin and/or polyisobutylene resin, each having a functional group capable of reacting with an epoxy group used in the present invention (hereinafter to be also abbreviated as "component (B)") acts as a softening agent to appropriately suppress tackiness of the obtained resin composition sheet. It improves the handling property of the sheet in a lamination step, and maintains good resistance to moisture permeability and properties such as adhesiveness to a substrate and the like.

A softening agent added for reduction and adjustment of the viscosity of varnish to the level desired for varnish coating generally tends to be one cause of tackiness of a sheet. However, component (B) used in the present invention shows good compatibility with a polyisobutylene resin (component (A)), and provides an effect of varnish viscosity control. In addition, the liquidity of varnish can be suppressed by a crosslinking reaction after sheet formation and tackiness of a sheet can be drastically reduced to a handlable level. As used herein, reduction of tackiness means reduction of a tackiness force to preferably not more than 12N/cm$^2$, more preferably not more than 0.5N/cm$^2$.

Component (B) is constituted by one or both of (B1) a resin wherein a functional group capable of reacting with an epoxy group is bonded to the main chain and/or a side chain of a polymer comprising a polyisoprene backbone as a main constituent (i.e., copolymer wherein an appropriate amount of an olefinic compound such as butene-1, butene-2, and the like is copolymerized with isoprene homopolymer or isoprene (hereinafter they are generically referred to as "isoprene system polymer" or block or graft copolymer having a polyisoprene segment and a polymer segment comprised of a monomer component other than isoprene), or (B2) a resin wherein a functional group capable of reacting with an epoxy group is bonded to the main chain and/or a side chain of a polymer comprising a polyisobutylene backbone as a main constituent (i.e., an isobutylene polymer, or a block or graft copolymer having a polyisobutylene segment and a polymer segment comprised of a monomer component other than isobutylene).

As the above-mentioned monomer component other than isoprene, isobutylene, styrene, butadiene, ethylene, propylene, acrylonitrile, vinyl chloride, vinyl bromide, hydrogenated styrene, pentadiene, cyclopentadiene, dicyclopentadiene, and the like can be recited as examples and one or more kinds of these can be used. As the above-mentioned monomer component other than isobutylene, isoprene, styrene, butadiene, ethylene, propylene, acrylonitrile, vinyl chloride, vinyl bromide, hydrogenated styrene, pentadiene, cyclopentadiene, dicyclopentadiene, and the like can be recited as examples and one or more kinds of these can be used.

In the above-mentioned block or graft copolymer, the proportion of the polyisoprene segment or polyisobutylene segment is preferably not less than 50 mass %, more preferably not less than 60 mass %, further preferably not less than 80 mass %, particularly preferably not less than 90 mass %, of the whole polymer; and the proportion of the polymer segment comprised of a monomer component other than isoprene or the polymer segment comprised of a monomer component other than isobutylene is preferably not more than 50 mass %, more preferably not more than 40 mass %, further preferably not more than 20 mass %, particularly preferably not more than 10 mass %, of the whole polymer.

The above-mentioned polymer comprising a polyisobutylene backbone as a main constituent is preferably an isobutylene polymer, and the above-mentioned polymer comprising a polyisoprene backbone as a main constituent is preferably an isoprene polymer.

The above-mentioned functional group capable of reacting with an epoxy group may have any structure as long as it does not exert an adverse influence on the desired resistance to moisture permeability and adhesiveness and, for example, an acid anhydride group [—C(O)—O—C(O)—], carboxyl group, epoxy group, amino group, hydroxyl group, isocyanate group, oxazoline group, oxetane group, cyanate group, phenol group [-Ph-OH], hydrazide group, amide group, and the like can be mentioned. These may be used alone or two or more kinds may be used. The number of these functional groups is preferably 1 to 15, more preferably 1 to 10, further preferably 1 to 5, on average per one molecule.

Specific examples of component (B) include maleic anhydride modified liquid polyisobutylene, maleic anhydride modified liquid polyisoprene, epoxy modified polyisoprene, hydroxyl group modified liquid polyisoprene, allyl modified liquid polyisoprene, and the like. Of these, maleic anhydride modified liquid polyisobutylene and maleic anhydride modified liquid polyisoprene are preferable from the aspects of compatibility with component (A), appropriate tackiness when the resin composition is formed into a sheet and reactivity with epoxy group. One or more kinds of these may be used in combination. The "liquid" refers to the state at room temperature (25° C.).

The maleic anhydride modified liquid polyisobutylene and maleic anhydride modified liquid polyisoprene preferably have an acid number of 5 to 60 mgKOH/g, more preferably 15 to 50 mgKOH/g, further preferably 25 to 45 mgKOH/g. The acid number here is based on JIS K 2501-2003 petroleum product and lubricating oil-neutralization number test method.

To improve processability of the resin composition, the number average molecular weight of component (B) is preferably not more than 100,000, more preferably not more than 80,000, further preferably not more than 60,000, still more preferably not more than 50,000. In addition, to express the resistance of the resin composition to moisture permeability, it is preferably not less than 300, more preferably not less than 500, further preferably not less than 700. In addition, component (B) is preferably liquid at room temperature (25° C.).

The number average molecular weight in the present invention is measured by gel permeation chromatography (GPC) method (polystyrene conversion). Specifically, the number average molecular weight by the GPC method can be measured using LC-9A/RID-6A manufactured by Shimadzu Corporation as a measuring apparatus, Shodex K-800P/K-804L/K-804L manufactured by Showa Denko K.K. as a column, chloroform and the like as a mobile phase, at a column temperature 40° C., and calculated using an analytical curve of standard polystyrene.

Examples of the commercial product usable as component (B) include maleic anhydride modified liquid polyisobutylene: HV-100M, HV-300M (manufactured by Nippon Oil Corporation), maleic anhydride modified liquid polyisoprene: liquid rubber LIR-403, LIR-410 (manufactured by Kuraray Co., Ltd.), hydroxyl group modified liquid polyisoprene: liquid rubber LIR-506 (manufactured by Kuraray Co., Ltd.), allyl modified liquid polyisoprene: liquid rubber UC-203, UC-102 (manufactured by Kuraray Co., Ltd.), epoxy modified isoprene copolymerized polymer: liquid rubber KLP L-207 (manufactured by Kuraray Co., Ltd.) and the like.

One or more kinds can be used for component (B). While the content of component (B) in a resin composition is not particularly limited, it is preferably not more than 50 mass % more preferably not more than 20 mass %, further preferably not more than 15 wt %, still more preferably not more than 12 mass %, especially preferably not more than 9 mass %, particularly preferably not more than 6 mass %, relative to 100 mass % of a non-volatile component in the resin composition, since handling property (suppression of tackiness) of a sheet obtained from the resin composition can be ensured. In addition, it is preferably not less than 0.1 mass %, more preferably not less than 1 mass %, further preferably not less than 2 mass %, still more preferably not less than 3 mass %, especially preferably not less than 4 mass %, relative to 100 mass % of a non-volatile component in the resin composition, since good resistance of the resin composition to moisture permeability can be ensured.

In an attempt to adjust the handling property of a sheet obtained from the resin composition, it is also possible to concurrently use liquid polyisobutylene and/or liquid polyisoprene ((E) component) having an average molecular weight in a range equivalent to that of the above-mentioned component (B) and free of a functional group capable of reacting with an epoxy group, as long as the resistance to moisture permeability and adhesiveness are not adversely influenced. The "liquid polyisobutylene" here means a liquid isobutylene polymer, and the "liquid polyisoprene" means a liquid isoprene system polymer. The "liquid" refers to the state at room temperature (25° C.). Examples of commercial products of such liquid polyisobutylene and liquid polyisoprene include Tetrax 3T, 4T, 5T, 6T (manufactured by Nippon Oil Corporation), Nisseki polybutene LV series, HV series (manufactured by Nippon Oil Corporation), Nissan polybutene 0N, 06N, 015N, 3N, 5N, 10N, 30N, 200N (manufactured by NOF CORPORATION) and the like for liquid polyisobutylene, and liquid rubber LIR-30, LIR-50 (manufactured by Kuraray Co., Ltd.) and the like for liquid polyisoprene. One or more kinds of these may be used in combination.

While the content of (E) component in a resin composition is not particularly limited, it is preferably not more than 20 mass %, more preferably not more than 15 mass %, relative to 100 mass % of a non-volatile component in the resin composition, since desired tackiness can be maintained. To sufficiently express the effect provided by addition of the component, it is preferably not less than 1 mass %, more preferably not less than 2 mass %, relative to 100 mass % of a non-volatile component in the resin composition.

(C) Tackifier Resin.

The (C) tackifier resin used in the present invention (hereinafter to be also abbreviated as "component (C)") can improve adhesiveness of the resin composition as well as stably maintain other characteristics. The component (C) is not particularly limited, and terpene resin, modified terpene resin (hydrogenated terpene resin, terpene phenol copolymer resin, aromatic modified terpene resin, etc.), cumarone resin, inden resin, petroleum resin (aliphatic petroleum resin, hydrogenated alicyclic petroleum resin, aromatic petroleum resin, aliphatic aromatic copolymer petroleum resin, alicyclic petroleum resin, dicyclopentadiene petroleum resin and hydrides thereof, etc.) are preferably used. Of these, terpene resin, aromatic modified terpene resin, terpene phenol copolymer resin, hydrogenated alicyclic petroleum resin, aromatic petroleum resin, aliphatic aromatic copolymer petroleum resin, and alicyclic petroleum resin are preferable from the aspects of compatibility, adhesiveness and resistance to moisture permeability. One or more kinds of component (C) may be used in combination.

Examples of commercial products usable as component (C) include YS Resin PX, YS Resin PXN (both manufactured by YASUHARA CHEMICAL CO., LTD.) and the like for terpene resin, YS Resin TO, TR series (all manufactured by YASUHARA CHEMICAL CO., LTD.) and the like for aromatic modified terpene resin, Clearon P, Clearon M, Clearon K series (all manufactured by YASUHARA CHEMICAL CO., LTD.) and the like for hydrogenated terpene resin, YS Polyster 2000, Polyster U, Polyster T, Polyster S, Mightyace G (all manufactured by YASUHARA CHEMICAL CO., LTD.) and the like for terpene phenol copolymer resin, Escorez 5300 series, 5600 series (all manufactured by Exxon Mobil Corporation) for hydrogenated alicyclic petroleum resin, ENDEX155 (manufactured by Eastman Chemical Company) for aromatic petroleum resin, QuintoneD100 (manufactured by Nippon Zeon Co., LTD.) for aliphatic aromatic copolymer petroleum resin, and Quintone1345 (manufactured by Nippon Zeon Co., LTD.) for alicyclic petroleum resin, and the like.

While the content of component (C) in the resin composition is not particularly limited, it is preferably not more than 70 mass %, more preferably not more than 60 mass %, relative to 100 mass % of a non-volatile component in the resin composition, to maintain good resistance to moisture permeability. In addition, it is preferably not less than 10 mass %, more preferably not less than 15 mass %, relative to 100 mass % of a non-volatile component in the resin composition, to provide sufficient adhesiveness.

The softening point of component (C) is preferably 50 to 200° C., more preferably 90 to 160° C., since the sheet is softened in a lamination step of the resin composition sheet and desired heat resistance is achieved. The softening point can be measured by a ring and ball method according to JIS K2207.

(D) Epoxy Resin.

The (D) epoxy resin used in the present invention (hereinafter to be also abbreviated as "component (D)") plays a role of improving the tackiness property of the resin composition and stably maintaining other characteristics. Component (D) is not particularly limited, and any having two or more epoxy groups on average per one molecule can be used. For example, a bisphenol A type epoxy resin, biphenyl type epoxy resin, biphenylaralkyl type epoxy resin, naphthol type epoxy resin, naphthalene type epoxy resin, bisphenol F type epoxy resin, phosphorus-containing epoxy resin, bisphenol S type epoxy resin, aromatic glycidyl amine type epoxy resin (e.g., tetraglycidyl diaminodiphenylmethane, triglycidyl-p-aminophenol, diglycidyl toluidine, diglycidyl aniline etc.), alicyclic epoxy resin, aliphatic chain epoxy resin, phenol novolac type epoxy resin, cresol novolac type epoxy resin, bisphenol A novolac type epoxy resin, epoxy resin having a butadiene structure, diglycidyl etherified product of bisphenol, diglycidyl etherified product of naphthalenediol, glycidyl etherified product of phenols, diglycidyl etherified product of alcohols, alkyl-substituted form, halide, and hydrogenated product of these epoxy resins and the like may be mentioned. One or more kinds of these may be used in combination.

Of these, the epoxy resin is preferably bisphenol A type epoxy resin, bisphenol F type epoxy resin, phenol novolac type epoxy resin, biphenylaralkyl type epoxy resin, phenolaralkyl type epoxy resin, aromatic glycidyl amine type epoxy resin, epoxy resin having a dicyclopentadiene structure, and the like, to maintain high heat resistance and superior resistance to moisture permeability of the resin composition of the present invention, and the like.

The epoxy resin may be liquid or solid or both liquid and solid epoxy resins may be used. Here, the "liquid" and "solid" mean the state of epoxy resin at room temperature (25° C.). A liquid epoxy resin and a solid epoxy resin may be used at any ratio, as long as the effect of maintenance of the tackiness property of the resin composition can be provided. In addition, the epoxy resin preferably has epoxy equivalents of 100 to 1500 g/eq, more preferably 150 to 1000 g/eq, further preferably 200 to 800, to maintain good resistance to moisture permeability and suppress tackiness. The "epoxy equivalent" is the number of grams (g/eq) of the resin containing 1 gram equivalent of epoxy group and can be measured according to the method defined in JIS K 7236.

As the epoxy resin, a commercial product can be used. For example, "828EL" (liquid bisphenol A type epoxy resin) manufactured by Japan Epoxy Resin, "HP4032" manufactured by DIC, "HP4032D" (naphthalene type bifunctional epoxy resin), "HP4700" (naphthalene type tetrafunctional epoxy resin) manufactured by DIC, "HP7200 series" (dicyclopentadiene type epoxy resin) manufactured by DIC, "ESN-475V" "ESN-185V" (naphthol type epoxy resin) manufactured by Tohto Kasei Co., Ltd., "PB-3600" (epoxy resin having butadiene structure) manufactured by DAICEL CHEMICAL INDUSTRIES, LTD., "NC3000H", "NC3000L", "NC3100", "NC3000", "NC3000FH-75M" (biphenyl type epoxy resin) manufactured by Nippon Kayaku Co., Ltd., "YX4000" (biphenyl type epoxy resin) manufactured by Japan Epoxy Resin, "YX8800" (anthracene backbone-containing type epoxy resin) manufactured by Japan Epoxy Resin, and the like may be mentioned. One or more kinds of these may be used in combination.

The content of (D) epoxy resin in the resin composition is not particularly limited. The upper limit of the content of the epoxy resin in the resin composition is preferably 20 mass %, more preferably 15 mass %, further preferably 10 mass %, still more preferably 8 mass %, especially preferably 6 mass %, particularly preferably 4 mass %, relative to 100 mass % of a non-volatile component in the resin composition, since good resistance to moisture permeability can be ensured. On the other hand, the lower limit of the content of the epoxy resin in the resin composition is preferably 0.1 mass %, more preferably 1 mass %, further preferably 2 mass %, relative to 100 mass % of a non-volatile component in the resin composition, since good handling property (suppression of tackiness) can be ensured In the resin composition of the present invention, the equivalent ratio of epoxy equivalents of component (D) and functional group equivalents of component (B) is preferably 1:0.4 to 1:2, more preferably 1:0.5 to 1:1.5. When the equivalent ratio is outside this range, the resistance to moisture permeability, adhesion strength, and handling property tend to be inferior.

In the resin composition of the present invention, while the mass ratio of component (D) and component (B) is not particularly limited, it is preferably 1:2 to 1:6, more preferably 1:3 to 1:5, further preferably 1:3 to 1:4. When the mass ratio is outside this range, the resistance to moisture permeability, adhesion strength and handling property tend to be inferior.

While the total amount of component (B) and component (D) in the resin composition is not particularly limited, it is preferably not more than 50 mass %, more preferably not more than 20 mass %, further preferably not more than 17 wt %, still more preferably not more than 14 mass %, especially preferably not more than 11 mass %, particularly preferably not more than 8 mass %, relative to 100 mass % of a non-volatile component in the resin composition, since good handling property (suppression of tackiness) and good resistance to moisture permeability of a sheet obtained from the resin composition can be ensured. In addition, it is preferably not less than 0.1 mass %, more preferably not less than 1 mass %, further preferably not less than 2 mass %, still more preferably not less than 3 mass %, especially preferably not less than 4 mass %, relative to 100 mass % of a non-volatile component in the resin composition, since good resistance to moisture permeability and good handling property (suppression of tackiness) of a sheet obtained from the resin composition can be ensured.

(F) Inorganic Filler.

By further adding an inorganic filler to the resin composition of the present invention to the extent the effect of the present invention is not inhibited, the resistance to moisture permeability of the cured product can be improved and the cissing during film processing can be prevented. While the inorganic filler is not particularly limited, silica, alumina, barium sulfate, talc, clay, mica powder, aluminum hydroxide, magnesium hydroxide, calcium carbonate, magnesium carbonate, boron nitride, aluminum borate, barium titanate, strontium titanate, calcium titanate, magnesium titanate, bismuth titanate, titanium oxide, barium zirconate, calcium zirconate, and the like can be mentioned. Of these, talc and mica are preferable and talc is particularly preferable to improve resistance to moisture permeability of a cured resin product. One or more kinds of these may be used in combination.

As the inorganic filler, one having improved resistance to humidity by a surface treatment with a surface treating agent is preferable. Examples of the surface treating agent include aminosilane coupling agents such as aminopropylmethoxysilane, aminopropyltriethoxysilane, ureidopropyltriethoxysilane, N-phenylaminopropyltrimethoxysilane, N-2(aminoethyl)aminopropyltrimethoxysilane, and the like; epoxysilane coupling agents such as glycidoxypropyltrimethoxysilane, glycidoxypropyltriethoxysilane, glycidoxypropylmethyldiethoxysilane, glycidyl butyltrimethoxysilane, (3,4-epoxycyclohexyl)ethyltrimethoxysilane, and the like; mercaptosilane coupling agents such as mercaptopropyltrimethoxysilane, mercaptopropyltriethoxysilane, and the like; silane coupling agents such as methyltrimethoxysilane, octadecyltrimethoxysilane, phenyltrimethoxysilane, methacryloxy propyltrimethoxysilane, imidazolesilane, triazinesilane, and the like; organosilazane compounds such as hexamethyldisilasane, hexaphenyldisilasane, trisilazane, cyclotrisilazane, 1,1,3,3,5,5-hexametymethylcyclotrisilazane, and the like; titanate coupling agents such as butyltitanate dimer, titanium octyleneglycollate, diisopropoxytitanium bis(triethanolaminato), dihydroxytitanium bislactate, dihydroxybis(ammoniumlactate)titanium, bis(dioctylpyrohosphate)ethylenetitanate, bis(dioctylpyrophosphate)oxyacetatetitanate, tri-n-butoxy titanium monostearate, tetra-n-butyltitanate, tetra(2-ethylhexyl)titanate, tetraisopropylbis(dioctylphosphite)titanate, tetraoctylbis(ditridecylphosphite)titanate, tetra(2,2-diallyloxymethyl-1-butyl)bis(ditridecyl)phosphitetitanate, isopropyltrioctanoyltitanate, isopropyltricumylphenyltitanate, isopropyltriisostearoyltitanate, isopropylisostearoyldiacrylictitanate, isopropyldimetacrylisostearoyltitanate, isopropyltri(dioctylphosphate)titanate, isopropyltridodecylbenzenesulfonyltitanate, isopropyltris(dioctylpyrophosphate)titanate, isopropyltri(N-amidoethyl.aminoethyl)titanate, and the like; and the like. One or more kinds of these may be used in combination.

While the average particle size of the inorganic filler is not particularly limited, it is preferably not more than 10 μm, more preferably not more than 5 μm, to avoid damage on an OLED (organic light emitting diode) device. On the other hand, it is preferably not less than 0.05 μm, more preferably not less than 0.1 μm, to allow expression of resistance to moisture permeability.

The above-mentioned average particle size of an inorganic filler can be measured by a laser diffraction·scattering method based on the Mie scattering theory. Specifically, it can be measured by producing volume standard particle size distribution of an inorganic filler by a laser diffraction particle size analyzer, and determining the median diameter thereof as an average particle size. As a measurement sample, an inorganic filler dispersed in water by ultrasonication can be used preferably. As the laser diffraction particle size analyzer, LA-500 manufactured by Horiba, Ltd. and the like can be used.

While the content of the inorganic filler is not particularly limited, it is preferably not more than 50 mass %, more preferably not more than 40 mass %, further preferably not more than 30 mass %, relative to 100 mass % of a non-volatile component in the resin composition, to prevent increase of the viscosity of a resin composition, and prevent the cured product from becoming brittle due to the decreased strength thereof. On the other hand, to provide a sufficient effect by the addition of an inorganic filler, it is preferably not less than 1 mass %, more preferably not less than 5 mass %, further preferably not less than 10 mass %, relative to 100 mass % of a non-volatile component in the resin composition.

(G) Hygroscopic Metal Oxide.

The resin composition of the present invention can further contain one or more hygroscopic metal oxides to further improve resistance to moisture permeability of the cured product. Here, "hygroscopic metal oxide" means metal oxide that can absorb moisture and chemically react with the absorbed moisture to be a hydroxide. It is specifically one kind selected from calcium oxide, magnesium oxide, strontium oxide, aluminum oxide, barium oxide, and the like, or a mixture or solid solution of two or more kinds therefrom. Of these, from the aspects of high hygroscopicity, cost and stability of starting material, calcium oxide and magnesium oxide are preferable. Specific examples of the mixture or solid solution of two or more kinds therefrom include calcined dolomite (mixture containing calcium oxide and magnesium oxide), calcined hydrotalcite (solid solution of calcium oxide and aluminum oxide) and the like. Such hygroscopic metal oxides are known as hygroscopic materials in various technical fields, and commercial products can be used. Specifically, calcium oxide ("Moistop #10" manufactured by SANKYO SEIFUN Co., LTD. etc.), magnesium oxide ("Kyowamag MF-150", "Kyowamag MF-30" manufactured by Kyowa Chemical Industry Co., Ltd., "PUREMAG FNMG" manufactured by Tateho Chemical Industries Co., Ltd. etc.), light burnt magnesium oxide ("#500", "#1000", "#5000" manufactured by Tateho Chemical Industries Co., Ltd. etc.), calcined dolomite ("KT" manufactured by Yoshizawa Lime Industry CO., LTD. etc.), calcined hydrotalcite ("hydrotalcite" manufactured by TODA KOGYO CORP. etc.), and the like can be mentioned. One or more kinds of these may be used in combination.

While the average particle size of the hygroscopic metal oxide is not particularly limited, it is preferably not more than 10 μm, more preferably not more than 5 μm, further preferably not more than 1 μm, to prevent damage on an OLED (organic light emitting diode) device by crude particles in a sealing step and increase an interface binding force with a resin component. On the other hand, it is preferably not less than 0.001 μm, more preferably not less than 0.01 μm, further preferably not less than 0.1 μm, to prevent easy coagulation of particles, which causes dispersion failure thereof in the composition, thus making it difficult to impart a cured product with sufficiently high resistance to moisture permeability.

When a commercial product of a hygroscopic metal oxide has an average particle size of not more than 10 μm, it can be directly used. When the average particle size of a commercial product exceeds 10 μm, the product is preferably used after adjusting to an average particle size of not more than 10 μm by pulverization, classification, and the like.

In addition, the hygroscopic metal oxide preferably has an average particle size within the above-mentioned preferable range, and is free of coarse particles having a particle size of not less than 20 μm. More preferably, it is free of coarse particles of not less than 5 μm. Due to the absence of such coarse particles, it acts advantageously without easily damaging an EL device in a sealing step.

The above-mentioned average particle size of the hygroscopic metal oxide can be measured by a laser diffraction•scattering method based on the Mie scattering theory. Specifically, it can be measured by producing volume standard particle size distribution of hygroscopic metal oxide by a laser diffraction particle size analyzer, and determining the median diameter thereof as an average particle size. As a measurement sample, a hygroscopic metal oxide dispersed in water by ultrasonication can be used preferably. As the laser diffraction particle size analyzer, LA-500 manufactured by Horiba, Ltd. can be used.

As the hygroscopic metal oxide, one surface-treated with a surface treating agent can be used. By using such hygroscopic metal oxide surface-treated with a surface treating agent, adhesion stability of a cured product can be enhanced, and a reaction of moisture in a resin and hygroscopic metal oxide in a stage before curing can be prevented.

Examples of the surface treating agent to be used for the surface treatment include a higher fatty acid, alkylsilanes, silane coupling agent, and the like. Of these, higher fatty acids and alkylsilanes are preferable. One or more kinds of these may be used in combination.

As the higher fatty acid, for example, a higher fatty acid having a carbon number of not less than 18, such as stearic acid, montanic acid, myristic acid, palmitic acid, and the like, is preferable. Of these, stearic acid is preferable. One or more kinds of these may be used in combination.

Examples of the alkylsilanes include methyltrimethoxysilane, ethyltrimethoxysilane, hexyltrimethoxysilane, octyltrimethoxysilane, lo decyltrimethoxysilane, octadecyltrimethoxysilane, dimethyldimethoxysilane, octyltriethoxysilane, n-octadecyldimethyl(3-(trimethoxysilyl)propyl)ammonium chloride, and the like. One or more kinds of these may be used in combination.

Examples of the silane coupling agent include epoxide silane coupling agents such as 3-glycidyloxypropyltrimethoxysilane, 3-glycidyloxypropyltriethoxysilane, 3-glycidyloxypropyl(dimethoxy)methylsilane, 2-(3,4-epoxycyclohexyl)ethyltrimethoxysilane, and the like; mercapto silane coupling agents such as 3-mercaptopropyltrimethoxysilane, 3-mercaptopropyltriethoxysilane, 3-mercaptopropylmethyldimethoxysilane, 11-mercaptoundecyltrimethoxysilane, and the like; amino silane coupling agents such as 3-aminopropyltrimethoxysilane, 3-aminopropyltriethoxysilane, 3-aminopropyldimethoxymethylsilane, N-phenyl-3-aminopropyltrimethoxysilane, N-methylaminopropyltrimethoxysilane, N-(2-aminoethyl)-3-aminopropyltrimethoxysilane, N-(2-aminoethyl)-3-aminopropyldimethoxymethylsilane, and the like; ureido silane coupling agents such as 3-ureidopropyltriethoxysilane and the like; vinyl silane coupling agents such as vinyltrimethoxysilane, vinyltrimethoxysilane, vinylmethyldiethoxysilane, and the like; styryl silane coupling agents such as p-styryltrimethoxysilane and the like; acrylate silane coupling agents such as 3-acrylicoxypropyltrimethoxysilane, 3-methacryloxypropyltrimethoxysilane, and the like; isocyanate silane coupling agents such as 3-isocyanatepropyltrimethoxysilane and the like; sulfide silane coupling agents such as bis(triethoxysilylpropyl)disulfide, bis(triethoxysilylpropyl)tetrasulfide, and the like; phenyltrimethoxysilane, methacryloxypropyltrimethoxysilane; imidazolesilane; triazinesilane; and the like. One or more kinds of these may be used in combination.

The surface treatment can be performed by, for example, adding and spraying a surface treating agent while stirring and dispersing untreated the hygroscopic metal oxide in a blending machine at ambient temperature and stirring the mixture for 5 to 60 minutes. As a blending machine, a known blending machine can be used and, for example, blenders such as V blender, ribbon blender, double cone blender, and the like; mixers such as Henschel mixer, concrete mixer, and the like; ball mill; cutter mill; and the like can be mentioned. In addition, a method including mixing the aforementioned higher fatty acid, alkylsilanes or silane coupling agent while pulverizing a hygroscopic material in a ball mill and the like to perform a surface treatment can also be used. While the throughput of the surface treating agent varies depending on the kind of hygroscopic metal oxide, the kind of the surface treating agent and the like, it is preferably 1 to 10 wt % relative to hygroscopic metal oxide.

While the content of the hygroscopic metal oxide is not particularly limited, it is preferably not more than 50 mass %, more preferably not more than 40 mass %, further preferably not more than 30 mass %, relative to 100 mass % of a non-volatile component in the resin composition, to prevent increase of the viscosity of a resin composition, and prevent the cured product from becoming brittle due to the decreased strength thereof. On the other hand, to provide a sufficient effect by the addition of an inorganic filler, it is preferably not less than 1 mass %, more preferably not less than 5 mass %, further preferably not less than 10 mass %, relative to 100 mass % of a non-volatile component in the resin composition.

(H) Curing Agent.

By further adding a curing agent to the resin composition of the present invention to the extent the effect of the present invention is not inhibited, curing performance of the resin composition can be improved. In the present invention, the curing agent means a conventional curing agent for epoxy resins, and is not particularly limited. Examples thereof include an imidazole curing agent, amine curing agent, phenol curing agent, and the like. One or more kinds of these may be used in combination.

While the kind of the imidazole curing agent and amine curing agent is not particularly limited, examples thereof include quaternary ammonium salts such as tetramethyl ammonium bromide, tetrabutyl ammonium bromide, and the like; quaternary phosphonium salts such as tetraphenyl phosphonium bromide, tetrabutyl phosphonium bromide, and the like; diazabicyclo compounds such as DBU (1,8-diazabicyclo(5.4.0)undecene-7), DBN (1,5-diazabicyclo(4.3.0)nonene-5), DBU-phenol salt, DBU-octyl acid salt, DBU-p-toluenesulfonate, DBU-formate, DBU-phenolnovolac resin salt, and the like; imidazole compounds such as 1H-imidazole, 2-methyl-imidazole, 2-phenyl-4-methyl-imidazole, 1-cyanoethyl-2-ethyl-4-methyl-imidazole, 2-phenyl-4,5-bis(hydroxymethyl)-imidazole, 1-benzyl-2-methylimidazole, 1-benzyl-2-phenylimidazole, 2-ethyl-4-methylimidazole, and the like, 2-phenyl-imidazole, 2-dodecyl-imidazole, 2-heptadecylimidazole, 1,2-dimethyl-imidazole, and halides thereof, and salts thereof such as trimellitic acid salt thereof, isocyanuric acid salt thereof and the like; tertiary amines such as 2,4,6-tris(dimethylamino)methylphenol, benzyldimethylamine, 2-(dimethylaminomethyl)phenol, and the like and salts thereof, dimethylurea compounds such as aromatic dimethylurea, aliphaticdimethylurea, aromatic dimethylurea, and the like; and the like. One or more kinds of these may be used in combination.

While the kind of the phenol curing agent is not particularly limited, MEH-7700, MEH-7810, MEH-7851 (manufactured by MEIWA PLASTIC INDUSTRIES, LTD.), NHN, CBN, GPH (manufactured by Nippon Kayaku Co., Ltd.), SN170, SN180, SN190, SN475, SN485, SN495, SN375, SN395 (manufactured by Tohto Kasei Co., Ltd.), TD2090 (manufactured by DIC Corporation), and the like can be mentioned. Specific examples of the triazine backbone-containing phenol curing agent include LA3018 (manufactured by DIC Corporation) and the like. Specific examples of the triazine backbone-containing phenolnovolac curing agent include LA7052, LA7054, LA1356 (manufactured by DIC Corporation), and the like. One or more kinds of these may be used in combination.

While the content of the curing agent is not particularly limited, it is preferably not more than 5 mass %, more preferably not more than 1 mass %, relative to 100 mass % of a non-volatile component in the resin composition, to prevent decrease of the resistance to moisture permeability. On the other hand, it is preferably not less than 0.01 mass %, more preferably not less than 0.05 mass %, relative to 100 mass % of a non-volatile component in the resin composition, to allow expression of good tackiness.

Resin Additive.

The resin composition of the present invention may optionally contain various resin additives other than the afore-mentioned components to the extent the effect of the present invention is not inhibited. Examples of the resin additives include organic fillers such as rubber particle, silicon powder, nylon powder, fluorine powder, and the like; thickeners such as orben, Benton, and the like, silicone, fluorine and polymer antifoaming agents or leveling agents; adhesion imparting agents such as triazole compound, thiazole compound, triazine compound, porphyrin compound and the like; and the like.

The preparation method of the resin composition of the present invention is not particularly limited, and a method including mixing the components to be added in a rotary mixer and the like with the addition of, where necessary, solvent and the like, and the like can be mentioned.

While the use of the resin composition of the present invention is not particularly limited, it can be used as a sealing material for various devices such as semiconductor, solar cell, high luminance LED, LCD, OLED (organic light emitting diode), and the like, particularly preferably OLED (organic light emitting diode) device.

Resin Composition Sheet.

The resin composition sheet of the present invention includes both a sheet formed from the resin composition itself of the present invention and a sheet obtained by forming a layer of the resin composition of the present invention on a support. For application to various devices, a resin composition sheet obtained by forming a layer of the resin composition of the present invention on a support may be laminated on the necessary part of an application target and the resin composition layer may be transferred to the application target.

When a resin composition sheet obtained by forming a layer of the resin composition of the present invention on a support is applied to an OLED (organic light emitting diode) device, since the sheet is cured in advance before a sealing step of an OLED (organic light emitting diode) device, thermal curing is not required after the OLED (organic light emitting diode) device sealing step and a sheet capable of drastically reducing heat degradation of the OLED (organic light emitting diode) device can be provided. Industrially, a method using such resin composition sheet is preferable.

A resin composition sheet having a support can be produced by a method known to those of ordinary skill in the art, for example, by preparing a varnish by dissolving a resin composition in an organic solvent, applying the varnish on a support, and drying the organic solvent by heating, hot wind (air) blowing, and the like.

Examples of the organic solvent include acetone; ketones such as methyl ethyl ketone (hereinafter to be also abbreviated as "MEK"), cyclohexanone, and the like; acetic acid esters such as ethyl acetate, butyl acetate, cellosolve acetate, propylene glycol monomethyletheracetate, carbitol acetate, and the like; carbitols such as cellosolve, butylcarbitol, and the like; aromatic hydrocarbons such as toluene, xylene, and the like; dimethylformamide; dimethylacetamide; N-methylpyrrolidone; and the like. From the aspects of shelf life of a resin composition sheet (estimated usable period), one with a low boiling point is preferable, and one or more kinds of these may be used in combination.

While the drying condition of the resin composition sheet of the present invention is not particularly limited, 50 to 100° C. for 3 to 60 minutes is preferable. When it is less than 50° C., the amount of solvent remaining in the resin composition layer tends to increase.

The resin composition sheet of the present invention can be cured before a sealing step by heating to allow reaction of component (B) and component (D). By such curing, a resin composition sheet having sufficient resistance to moisture permeability and good adhesiveness and handling property can be afforded. While the curing condition is not particularly limited, the cure temperature is preferably 85 to 200° C., more preferably 100 to 180° C., further preferably 120 to 160° C. The cure time is preferably 15 to 120 minutes, more preferably 30 to 100 minutes.

The resin composition sheet after such curing has a thickness of preferably 3 μm to 200 μm, more preferably 5 μm to 100 μm, further preferably 5 μm to 50 μm.

The resin composition sheet after such curing preferably shows a resin composition weight loss (amount of residual solvent) of not more than 0.1% when dried at 130° C. for 15 minutes. When it is not more than 0.1%, a damage-reducing effect on the device after an OLED (organic light emitting diode) device sealing step is improved.

As mentioned below, in a structure wherein a sealing substrate is laminated on a resin composition sheet, since the moisture enters from the side of the resin composition sheet, the resin composition sheet desirably has a small layer thickness to reduce a contact area with the outside air and shut off the moisture. When the layer thickness is too small, thickness uniformity of the coated film lowers after transfer of the OLED (organic light emitting diode) device onto a formed substrate (hereinafter to be also referred to as "OLED (organic light emitting diode) device forming substrate"). As a result, the device may be damaged and workability when the sealing substrate is adhered tends to decrease.

As a support to be used for a resin composition sheet, a support (sealing substrate) having moisture barrier property is preferably used. As the sealing substrate, a plastic film having moisture barrier property; a metal foil such as copper foil, aluminum foil, and the like; and the like can be mentioned. As the plastic film having moisture barrier property, a plastic film having an inorganic matter such as silicon oxide (silica), silicon nitride, SiCN, amorphous silicon, and the like vapor-deposited on the surface and the like can be mentioned. As the plastic film, for example, a plastic film of polyolefin such as polyethylene, polypropylene, polyvinyl chloride, and the like; polyester such as poly(ethylene terephthalate) (hereinafter to be sometimes abbreviated as "PET"), poly(ethylene naphthalate), and the like; polycarbonate; polyimide; and the like can be used. As the plastic film, PET is particularly preferable. Examples of a commercially available plastic film having moisture barrier property include TECHBARRIER HX, AX, LX, L series (manufactured by MITSUBISHI PLASTICS INDUSTRIES), X-BARRIER having enhanced moisture-proof effect (manufactured by MITSUBISHI PLASTICS INDUSTRIES) and the like. As a sealing substrate, one having a multilayer structure of two or more layers may be used. To improve the handling property, moreover, a support wherein the aforementioned plastic film and the aforementioned metal foil are adhered with an adhesive is economical and industrially convenient. A plastic film and the like free of moisture barrier property can also be used as a support. In this case, it is preferable to form a resin composition sheet on a substrate on which an OLED (organic light emitting diode) device has been formed, detach the support and separately laminate a sealing substrate on the resin composition sheet.

While the thickness of the support is not particularly limited, it is preferably 10 to 150 μm, more preferably 20 to 100 μm, from the aspect of handling property and the like of the resin composition sheet.

The resin composition sheet of the present invention is preferably protected with a protective film until it is actually used for formation of a sealing structure, so that attachment of dirt and the like to and scars on the surface of the resin composition sheet can be prevented. As the protective film, the plastic films exemplified as the support can be used. The protective film may be previously subjected to a release treatment in addition to a matting treatment, a corona treatment, etc. Specific examples of the release agent include a fluorinated release agent, silicone release agent, alkyd resin release agent, and the like. Different kinds of release agents may be mixed and used.

While the thickness of the protective film is not particularly limited, it is preferably 1 to 40 μm, more preferably 10 to 30 μm.

Production Method of OLED (Organic Light Emitting Diode) Device,

The sealing step of an OLED (organic light emitting diode) device by using the resin composition sheet of the present invention can be performed by laminating the resin composition sheet on a substrate on which an OLED (organic light emitting diode) device has been formed to cover the OLED (organic light emitting diode) device with the resin composition sheet. When the resin composition sheet is protected with a protective film, the resin composition sheet is laminated on the substrate after detaching the protective film, so that the resin composition sheet can directly contact the substrate. The method of lamination may be of a batch type or a continuous system on a roll. When the support of the resin composition sheet is a sealing substrate, the resin composition sheet is directly laminated on a substrate on which an OLED (organic light emitting diode) device has been formed, with which the sealing step of the OLED (organic light emitting diode) device is completed without detaching the support.

On the other hand, when a support without moisture barrier property is used, the support is detached and a sealing substrate is pressed against an exposed resin composition layer, whereby a sealing step of an OLED (organic light emitting diode) device is completed. In this case, as the sealing substrate, a material with high moisture barrier property such as a plastic plate (sheet, film) with a moisture-proof layer, a metal foil, and the like is used. It is also possible to use a sealing substrate without flexibility, such as glass palate, metal plate, steel sheet, and the like, which are unsuitable as a support of a resin composition sheet. Two or more of these sealing substrates may be adhered and used to improve the moisture-proof effect. The thickness of the sealing substrate is preferably not more than 5 mm, more preferably not more than 1 mm, particularly preferably not more than 100 μm, to afford a thin and light OLED (organic light emitting diode) device, and it is preferably not less than 5 μm, more preferably not less than 10 μm, particularly preferably not less than 20 μm, to prevent moisture permeation. The pressure applied onto the sealing substrate for press adhesion is preferably about 0.3 to 10 kgf/cm$^2$, and the temperature is 25° C. (room temperature) to about 130° C. when pressed with heating.

When an OLED (organic light emitting diode) device is formed on a transparent substrate, the support is not necessarily be a transparent material as long as the transparent substrate side is used as a visual surface of a display or a light-emitting face of a lighting equipment, and a metal plate, a metal foil, an opaque plastic film or board, and the like may be used. Conversely, when an OLED (organic light emitting diode) device is formed on a substrate made from an opaque or low transparent material, the sealing substrate side needs to be a visual surface of a display or a light-emitting face of a lighting equipment, and therefore, a glass plate, a transparent plastic film, a transparent plastic plate, and the like are used as the sealing substrate.

While the resin composition sheet of the present invention is cured in advance before a sealing step for lamination on a substrate, it has sufficient adhesiveness, does not require thermal curing after the sealing step, does not require thermal curing after a sealing step of an OLED (organic light emitting diode) device, and can drastically reduce heat degradation of the OLED (organic light emitting diode) device. While thermal curing may be applied after the sealing step as necessary, the temperature of thermal curing after sealing in this case is preferably 50 to 150° C., more preferably 60 to 100° C., further preferably 60 to 80° C., to avoid heat degradation of the OLED (organic light emitting diode) device. It is particularly preferable to cure the sheet in advance before a sealing step for lamination on a substrate, since the absence of the need for thermal curing after the sealing step drastically reduces heat degradation of the OLED (organic light emitting diode) device.

After curing the resin composition sheet of the present invention, the resin composition sheet is laminated on a substrate and a sealing step is performed utilizing the thermoplasticity of component (A), component (B), and component (C), whereby an OLED (organic light emitting diode) device can be produced without a heating step necessary for curing after the sealing step with the resin composition sheet. As a result, heat degradation of an OLED (organic light emitting diode) device can be drastically suppressed as compared to thermal curing type sealing resins.

Other features of the invention will become apparent in the course of the following descriptions of exemplary embodiments which are given for illustration of the invention and are not intended to be limiting thereof.

EXAMPLES

Unless particularly indicated in the following description, "parts" means "parts by mass", and "%" means "mass %".
Materials.
The materials used for the experiments are explained.
(A) Polyisobutylene Resin
  polyisobutylene (isobutylene polymer) (Oppanol B100, viscosity average molecular weight 1,110,000, manufactured by BASF)
  polyisobutylene (isobutylene polymer) (B50SF, viscosity average molecular weight 400,000, manufactured by BASF)
  styrene-isobutylene-styrene block copolymer (SIBSTAR T102, number average molecular weight 100,000, styrene content: 30%, manufactured by KANEKA CORPORATION)
(B) Polyisoprene Resin and/or Polyisobutylene Resin, Each Having a Functional Group Capable of Reacting with an Epoxy Group
  maleic anhydride modified liquid polyisobutylene (HV-300M (HV-300: modified product having number-average molecular weight 1400), number of functional groups: 3.2/molecule, acid number: 43.4 mgKOH/g, manufactured by Nippon Oil Corporation)
(C) Tackifier Resin
  hydrogenated alicyclic petroleum resin (Escorez5340)
  modified terpene resin (hydrogenated terpene resin, Clearon P125, softening point 125° C., manufactured by YASUHARA CHEMICAL CO., LTD.)
  terpene resin (terpene polymer, YS Resin PX1150N, softening point 115° C., manufactured by YASUHARA CHEMICAL CO., LTD.)
  modified terpene resin (terpene phenol copolymer resin, YS Polyster T145, softening point 145° C., manufactured by YASUHARA CHEMICAL CO., LTD.)
  petroleum resin (aliphatic aromatic copolymer petroleum resin, Quintone D100, softening point 100° C., manufactured by Nippon Zeon Co., Ltd.)
  petroleum resin (alicyclic petroleum resin, Quintone1345, softening point 140° C., manufactured by Nippon Zeon Co., Ltd.)
  aromatic petroleum resin (styrene oligomer resin, ENDEX155, softening point 153° C., manufactured by Eastman Chemical Company)
(D) Epoxy Resin
  solid epoxy resin ("HP7200H" manufactured by DIC Corporation: dicyclopentadiene type solid epoxy resin, epoxy equivalents (278 g/eq))
(E) Liquid Polyisobutylene and/or Liquid Polyisoprene
  liquid polyisobutylene (Tetrax 3T, viscosity average molecular weight 30000, manufactured by Nippon Oil Corporation)
(F) Inorganic Filler
  talc ("D-600" manufactured by Nippon Talc Co., Ltd.)
(G) Hygroscopic Metal Oxide
  calcined hydrotalcite (manufactured by TODA KOGYO CORP.)
(H) Curing Agent
  anion polymerization type curing agent (2,4,6-tris(diaminomethyl)phenol, hereinafter to be abbreviated as "TAP")
  DYCY (dicyandiamide)
  pyromellitic anhydride
(I) Others
  solvent: ipzole 150 (aromatic mixed solvent) (manufactured by Idemitsu Kosan Co., Ltd.)
Measurement Methods and Evaluation Methods.
The various measurement methods and evaluation methods are explained.
Evaluation of Wet Heat Resistance.

A resin composition sheet (length 50 mm, width 20 mm) formed on a PET film was laminated on an aluminum foil (length 100 mm, width 20 mm, thickness 50 μm, manufactured by SUMIKEI ALMINIUM FOIL Co., Ltd., stock number SA50) using a batch type vacuum laminater (Morton-724 manufactured by Nichigo-Morton Co., Ltd.). The lamination was performed under the conditions of temperature 80° C., pressure 1 kgf/cm$^2$ (9.8×10$^4$ Pa). The support was detached, and a glass plate (length 76 mm, width 26 mm, thickness 1.2 mm, microslide glass) was further laminated on the exposed resin composition sheet under the same conditions as the above. The obtained laminate was measured for the adhesion strength by detaching the sheet in a 90-degree direction relative to the length direction of the aluminum foil at a tension speed of 50 mm/minute (initial adhesion strength). Two samples were used and an average value was taken. In addition, a test piece produced in the same manner as above was maintained for 24 hours under the conditions of 121° C. and 100% RH, and measured for the adhesion strength according to the above-mentioned method (adhesion strength after environment test). The value of "adhesion strength after environment test÷initial adhesion strength×100" was evaluated as retention (%). When the retention was less than 50%, x (bad) was marked, when it was not less than 50% and less than 60%, ○ (pass) was marked, when it was not less than 60%, ⊙ (good) was marked, and when it was not less than 100%, ⊙○ (excellent) was marked.

Evaluation of Resistance to Moisture Permeability.

Using a resin composition sheet having a thickness of 40 μm, the measurement was performed by a cup method according to JIS Z0204. The measurement conditions were: temperature, 60° C.; relative humidity, 90%; and time, 24 hours. When the resistance to moisture permeability was less than 5 g/m² 24 hours, ⊙○ (excellent) was marked, when it was not less than 5 g/m² 24 hours and less than 10 g/m² 24 hours, ⊙ (good) was marked, when it was not less than 10 g/m² 24 hours, and less than 34 g/m² 24 hours, ○ (pass) was marked, and when it was not less than 34 g/m² 24 hours, x (bad) was marked.

Evaluation of Handling Property.

Tackiness force was measured by a Probe Tack Tester with thermostat chamber (TE-6002) manufactured by TESTER SANGYO Co., Ltd. An SUS 5 mmϕ cylindrical probe was contacted with a resin composition sheet stood in the chamber at 25° C. at a contact rate of 0.5 cm/second, and a load applied to separate the probe at 100 g/cm² after maintaining for 1 second was measured. The measurement was performed three times per sample, and an average value of tackiness force was calculated for each measurement. When the tackiness force was less than 0.5 N/cm², ⊙ (good) was marked, when it was more than 0.5 N/cm² and less than 12 N/cm², ○ (pass) was marked, and when it was 12 N/cm² or more, x (bad) was marked.

Example 1

Polyisobutylene (Oppanol B100, 33% ipzole 150 solution, 41 parts) was mixed with a hydrogenated alicyclic petroleum resin (Escorez5340, 20 parts), liquid polyisobutylene (Tetrax3T, 5 parts), and maleic anhydride modified isobutylene (HV-300M, 9 parts), and the mixture was uniformly dispersed by a high-speed rotary mixer to give a mixed solution. This mixed solution was mixed with an epoxy resin (HP7200H, 50% ipzole solution, 5.3 parts) and an anion polymerization type curing agent (TAP, 0.6 part), and the mixture was uniformly dispersed by a high-speed rotary mixer to give a varnish.

The obtained varnish was uniformly applied on a release-treated surface of a PET film (thickness 38 μm) treated with an alkyd type release agent with a die coater such that the thickness of the resin composition layer after drying was 40 μm. The film was dried at 80° C. for 30 minutes and thermally cured at 120° C. for 30 minutes to give a resin composition sheet.

Example 2

In the same manner as in Example 1 except that polyisobutylene (Oppanol B100, 33% ipzole 150 solution) was set to 50 parts, the hydrogenated alicyclic petroleum resin (Escorez5340) was set to 30 parts, and liquid polyisobutylene (Tetrax3T) was set to 9 parts, a varnish was obtained according to the mixing recipe in the following Table 1. Using the obtained varnish and in completely the same manner as in Example 1, a resin composition sheet was obtained.

Example 3

In the same manner as in Example 1 except that a terpene resin (YS Resin PX 1150N, 20 parts), a terpene phenol copolymer resin (YS Polyster T145, 60% ipzole 150 solution, 15 parts), and liquid polyisobutylene (Tetrax3T, 9 parts) were used instead of the hydrogenated alicyclic petroleum resin (Escorez5340, 20 parts), a varnish was obtained according to the mixing recipe in the following Table 1. Using the obtained varnish and in completely the same manner as in Example 1, a resin composition sheet was obtained.

Example 4

In the same manner as in Example 3 except that a modified terpene resin (Clearon P125, 20 parts) was used instead of the terpene resin (YS Resin PX1150N, 20 parts), a varnish was obtained according to the mixing recipe in the following Table 1. Using the obtained varnish and in completely the same manner as in Example 1, a resin composition sheet was obtained.

Example 5

In the same manner as in Example 3 except that calcined hydrotalcite (60 parts) was further added to the mixed solution, and the mixture was uniformly dispersed and mixed by an azihomo mixer robomix-type mixing-stirring machine (manufactured by PRIMIX Corporation), a varnish was obtained according to the mixing recipe in the following Table 1. Using the obtained varnish and in completely the same manner as in Example 1, a resin composition sheet was obtained.

Example 6

In the same manner as in Example 3 except that talc (60 parts) was further added to the mixed solution, and the mixture was uniformly dispersed and mixed by an azihomo mixer robomix-type mixing-stirring machine (manufactured by PRIMIX Corporation), a varnish was obtained according to the mixing recipe in the following Table 1. Using the obtained varnish and in completely the same manner as in Example 1, a resin composition sheet was obtained.

Example 7

A styrene-isobutylene-styrene block copolymer (SIB-STAR T102, 50% ipzole 150 solution, 47 parts) was mixed with a petroleum resin (Quintone D100, 53 parts), a petroleum resin (Quintone1345, 18 parts), liquid polyisobutylene (Tetrax3T, 6 parts), and maleic anhydride modified isobutylene (HV-300M, 6 parts), and the mixture was uniformly dispersed by a high-speed rotary mixer to give a mixed solution. This mixed solution was mixed with an epoxy resin (HP7200H, 50% ipzole 150 solution, 5.3 parts), an anion polymerization type curing agent (TAP, 0.6 part), and talc (60 parts), and the mixture was uniformly dispersed by a high-speed rotary mixer to give a varnish. Using the obtained varnish and in completely the same manner as in Example 1, a resin composition sheet was obtained.

Example 8

A polyisobutylene resin (B50SF, 25% ipzole 150 solution, 24 parts) and a styrene-isobutylene-styrene block copolymer (SIBSTAR T102, 50% ipzole 150 solution, 29 parts) were mixed with a petroleum resin (Quintone D100, 53 parts), an aliphatic hydrocarbon resin (ENDEX155, 18 parts), and maleic anhydride modified isobutylene (HV-300M, 6 parts), and the mixture was uniformly dispersed by a high-speed rotary mixer to give a mixed solution. This mixed solution was mixed with an epoxy resin (HP7200H, 50% ipzole 150 solution, 5.3 parts), an anion polymerization type curing agent (TAP, 0.6 part), and talc (60 parts), and the mixture was uniformly dispersed by a high-speed rotary mixer to give a varnish. Using the obtained varnish and in completely the same manner as in Example 1, resin composition sheet was obtained.

Example 9

A polyisobutylene resin (B50SF, 25% ipzole 150 solution, (41 parts) was mixed with a petroleum resin (Quintone D100, 53 parts), a petroleum resin (Quintone 1345, 18 parts), liquid polyisobutylene (Tetrax3T, 9 parts), and maleic anhydride modified isobutylene (HV-300M, 9 parts), and the mixture was uniformly dispersed by a high-speed rotary mixer to give a mixed solution. This mixed solution was mixed with an epoxy resin (HP7200H, 50% ipzole 150 solution, 5.3 parts), an anion polymerization type curing agent (TAP, 0.6 part), calcined hydrotalcite (30 parts), and talc (30 parts), and the mixture was uniformly dispersed by a high-speed rotary mixer to give a varnish. Using the obtained varnish and in completely the same manner as in Example 1, a resin composition sheet was obtained.

Example 10

A polyisobutylene resin (B50SF, 25% ipzole 150 solution) (50 parts) was mixed with a petroleum resin (Quintone D100, 53 parts), a petroleum resin (Quintone 1345, 9 parts), and maleic anhydride modified isobutylene (HV-300M, 9 parts), and the mixture was uniformly dispersed by a high-speed rotary mixer to give a mixed solution. This mixed solution was mixed with an epoxy resin (HP7200H, 50% ipzole 150 solution, 5.3 parts), an anion polymerization type curing agent (TAP, 0.6 part), calcined hydrotalcite (30 parts), and talc (30 parts), and the mixture was uniformly dispersed by a high-speed rotary mixer to give a varnish. Using the obtained varnish and in completely the same manner as in Example 1, a resin composition sheet was obtained.

Example 11

A styrene-isobutylene-styrene block copolymer (SIBSTAR T102, 50% ipzole 150 solution, 41 parts) was mixed with a terpene resin (YS Resin PX1150N, 53 parts), a terpene phenol copolymer resin (YS Polyster T145, 60% ipzole 150 solution, 18 parts), liquid polyisobutylene (Tetrax3T, 9 parts), and maleic anhydride modified isobutylene (HV-300M, 9 parts), and the mixture was uniformly dispersed by a high-speed rotary mixer to give a mixed solution. This mixed solution was mixed with an epoxy resin (HP7200H, 50% ipzole 150 solution, 5.3 parts), an anion polymerization type curing agent (TAP, 0.6 part), and talc (60 parts), and the mixture was uniformly dispersed by a high-speed rotary mixer to give a varnish. Using the obtained varnish and in completely the same manner as in Example 1, a resin composition sheet was obtained.

Comparative Example 1

Polyisobutylene (Oppanol B100, 33% ipzole 150 solution, 41 parts) was mixed with a hydrogenated alicyclic petroleum resin (Escorez5340, 20 parts) and liquid polyisobutylene (Tetrax3T, 15 parts), and the mixture was uniformly dispersed by a high-speed rotary mixer to give a mixed solution as a varnish. Using the obtained varnish and in completely the same manner as in Example 1, a resin composition sheet was obtained.

Comparative Example 2

In the same manner as in Comparative Example 1 except that a terpene resin (YS Resin PX1150N, 20 parts) and a terpene phenol copolymer resin (YS Polyster T145, 60% ipzole 150 solution, 15 parts) were used instead of the hydrogenated alicyclic petroleum resin (Escorez5340, 20 parts), and liquid polyisobutylene (Tetrax3T) was set to 9 parts, a varnish was obtained according to the mixing recipe in the following Table 2. Using the obtained varnish and in completely the same manner as in Example 1, a resin composition sheet was obtained.

Comparative Example 3

In the same manner as in Comparative Example 2 except that maleic anhydride modified isobutylene (HV-300M, 9 parts) and an anion polymerization type curing agent (TAP, 0.6 part) were further mixed, a varnish was obtained according to the mixing recipe in the following Table 2. Using the obtained varnish and in completely the same manner as in Example 1, a resin composition sheet was obtained.

Comparative Example 4

In the same manner as in Comparative Example 2 except that an epoxy resin (HP7200H, 50% ipzole 150 solution, 5.3 parts) and an anion polymerization type curing agent (TAP, 0.6 part) were further mixed, a varnish was obtained according to the mixing recipe in the following Table 2. Using the obtained varnish and in completely the same manner as in Example 1, a resin composition sheet was obtained.

Comparative Example 5

In the same manner as in Comparative Example 2 except that an epoxy resin (HP7200H, 50% ipzole 150 solution, 5.3 parts) and DICY (1 part) were further mixed, a varnish was obtained according to the mixing recipe in the following Table 2. Using the obtained varnish and in completely the same manner as in Example 1, a resin composition sheet was obtained.

Comparative Example 6

In the same manner as in Comparative Example 2 except that an epoxy resin (HP7200H, 50% ipzole 150 solution, 5.3 parts), an anion polymerization type curing agent (TAP, 0.6 part),and pyromellitic anhydride (9 parts) were further mixed, a varnish was obtained according to the mixing recipe in the following Table 2. Using the obtained varnish and in completely the same manner as in Example 1, a resin composition sheet was obtained.

The results are shown in Tables 1 and 2.

TABLE 1

| | | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|---|
| (A) | B100 | 41 | 50 | 41 | 41 | 41 | 41 | | | 24 | 41 | 50 | |
| | B50SF | | | | | | | | | | | | |
| | SIBSTAR T102 | | | | | | | 47 | 29 | | | 41 |
| (B) | HV-300M | 9 | 10 | 9 | 9 | 9 | 9 | 6 | 6 | 9 | 9 | 9 |
| (C) | Escorez5340 | 20 | 30 | | | | | | | | | |
| | Clearon P125 | | | | 20 | | | | | | | |
| | YS Resin PX1150N | | | 20 | | 20 | 20 | | | | | 53 |
| | YS Polyster T145 | | | 15 | 15 | 15 | 15 | | | | | 18 |
| | Quintone D100 | | | | | | | 53 | 53 | 53 | 53 | |
| | Quintone 1345 | | | | | | | 18 | | 18 | 9 | |
| | ENDEX155 | | | | | | | | 18 | | | |
| (D) | HP7200H | 5.3 | 5.3 | 5.3 | 5.3 | 5.3 | 5.3 | 5.3 | 5.3 | 5.3 | 5.3 | 5.3 |
| (E) | Tetrax3T | 5 | 9 | 9 | 9 | 9 | 9 | 6 | | 9 | | 9 |
| (F) | talc | | | | | | 60 | 60 | 60 | 30 | 30 | 60 |
| (G) | calcined hydrotalcite | | | | | 60 | | | | 30 | 30 | |
| (H) | TAP | 0.6 | 0.6 | 0.6 | 0.6 | 0.6 | 0.6 | 0.6 | 0.6 | 0.6 | 0.6 | 0.6 |
| | DICY | | | | | | | | | | | |
| | pyromellitic anhydride | | | | | | | | | | | |
| resistance to wet heat | initial adhesion strength (N/25 mm) | 10.6 | 14.1 | 9.8 | 9.2 | 11.3 | 12.3 | 11.3 | 14.4 | 13 | 14.7 | 9.9 |
| | adhesion strength (N/25 mm) after environment test | 8.4 | 8.8 | 5.1 | 4.9 | 9.4 | 6.3 | 9.9 | 11.8 | 13.5 | 21.5 | 11.1 |
| | retention (%) | ⊙ (79) | ⊙ (63) | ○ (52) | ○ (53) | ⊙ (83) | ○ (51) | ⊙ (87) | ⊙ (82) | ⊙○ (104) | ⊙○ (146) | ⊙○ (113) |
| resistance to moisture permeability | g/m² 24 hr | ○ (18.1) | ○ (18.3) | ○ (32.2) | ○ (29.2) | ⊙ (9.1) | ⊙ (6.4) | ○ (24.2) | ○ (30.4) | ○ (28.5) | ○ (31.5) | ⊙○ (4.2) |
| handling property | N/cm² | ○ (11.1) | ○ (2.2) | ○ (9.7) | ○ (6.4) | ⊙ (0.1) | ⊙ (0.1) | ⊙ (0.2) | ⊙ (0.2) | ⊙ (0.2) | ⊙ (0.3) | ⊙ (0.2) |

TABLE 2

| | | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|
| (A) | B100 | 41 | 41 | 41 | 41 | 41 | 41 |
| | B50SF | | | | | | |
| | SIBSTAR T102 | | | | | | |
| (B) | HV-300M | | | | 9 | | |
| (C) | Escorez5340 | 20 | | | | | |
| | Clearon P125 | | | | | | |
| | YS Resin PX1150N | | 20 | 20 | 20 | 20 | 20 |
| | YS Polyster T145 | | 15 | 15 | 15 | 15 | 15 |
| | Quintone D100 | | | | | | |
| | Quintone 1345 | | | | | | |
| | ENDEX155 | | | | | | |
| (D) | HP7200H | | | | 5.3 | 5.3 | 5.3 |
| (E) | Tetrax3T | 15 | 9 | 9 | 9 | 9 | 9 |
| (F) | talc | | | | | | |
| (G) | calcined hydrotalcite | | | | | | |
| (H) | TAP | | | | 0.6 | 0.6 | 0.6 |
| | DICY | | | | | 1 | |
| | pyromellitic anhydride | | | | | | 9 |
| resistance to humidity and heat | initial adhesion strength (N/25 mm) | 15.6 | 10.3 | 18.4 | 7.5 | 10.9 | 12.5 |
| | adhesion strength (N/25 mm) after environment test | 1.6 | 0.6 | 2.6 | 3.7 | 1.5 | 1.9 |
| | retention (%) | X (10) | X (6) | X (14) | X (49) | X (14) | X 15 |
| resistance to moisture permeability | g/m² 24 hr | ○ (22.7) | X (36.3) | X (37.7) | X (38.9) | X (39.9) | X (38.1) |
| handling property | N/cm² | X (19.2) | X (18.6) | X (20.5) | X (49.3) | ○ (0.6) | ○ (2.6) |

From Examples 1 through 11, it is clear that the resin composition sheet obtained from the resin composition of the present invention has a small tackiness force and shows superior handling properties when a resin composition sheet is laminated on an OLED (organic light emitting diode) device. In addition, the resin composition sheet does not positively require thermal curing for lamination, can be adhered with a sufficiently high adhesion force by heating at a low temperature of 80° C., can maintain high adhesion force even when placed under a high temperature and high humidity environment after lamination, and shows good resistance to moisture permeability. Therefore, according to the present invention, a resin composition and a resin composition sheet to be a sealing material capable of forming a highly reliable sealing structure for an OLED (organic light emitting diode) device, that easily suffers from degradation due to moisture and heat, without causing degradation of an OLED (organic light emitting diode) device can be obtained, and a highly reliable OLED (organic light emitting diode) device can be provided.

In contrast, Comparative Examples 1 and 2 do not use (B) a polyisoprene resin and/or a polyisobutylene resin, each having a functional group capable of reacting with an epoxy group, and (D) an epoxy resin; Comparative Example 3 does not use (D) an epoxy resin; and Comparative Example 4 does not use (B) a polyisoprene resin and/or a polyisobutylene resin, each having a functional group capable of reacting with an epoxy group, and therefore, the effect of the present invention is not exerted. In Comparative Examples 5 and 6, DICY and pyromellitic anhydride were used instead of (B) a polyisoprene resin and/or a polyisobutylene resin, each having a functional group capable of reacting with an epoxy group. However, it is clear that they do not satisfy retention of adhesion force and resistance to moisture permeability. That is, it is clearly important to form a crosslinking structure between components (B) of a polyisoprene resin and/or a polyisobutylene resin, each having a functional group capable of reacting with an epoxy group, and (D) an epoxy resin.

INDUSTRIAL APPLICABILITY

Since the resin composition of the present invention contains a particular polyisobutylene resin, a tackifier resin, and an epoxy resin, varnish coating is possible, a resin composition sheet having good resistance to moisture permeability, adhesiveness and handling property can be provided. Furthermore, it can be applied to use such as a sealing resin for a flat panel, a moisture-proof protective film for a print circuit board, a moisture-proof film for a lithium ion battery, a laminate film for packing and the like, and electric products such as television, cellular phone, digital camera and the like, vehicles such as motorcycle, automobile, electric train, boat and ship, airplane and the like, which are equipped with them, can also be provided.

Where a numerical limit or range is stated herein, the endpoints are included. Also, all values and subranges within a numerical limit or range are specifically included as if explicitly written out.

Obviously, numerous modifications and variations of the present invention are possible in light of the above teachings. It is therefore to be understood that, within the scope of the appended claims, the invention may be practiced otherwise than as specifically described herein.

All patents and other references mentioned above are incorporated in full herein by this reference, the same as if set forth at length.

The invention claimed is:

1. A resin composition, comprising:
 (A) at least one polyisobutylene resin;
 (B) at least one polyisoprene resin and/or at least one polyisobutylene resin, each having a functional group capable of reacting with an epoxy group;
 (C) at least one tackifier resin; and
 (D) at least one epoxy resin,
 wherein:
 the ratio of equivalents of epoxy groups in said at least one epoxy resin (D) to equivalents of functional groups in said at least one polyisoprene resin and/or at least one polyisobutylene resin (B) is 1:0.4 to 1:2;
 the mass ratio of said at least one epoxy resin (D) to said at least one polyisoprene resin and/or at least one polyisobutylene resin is 1:2 to 1:6; and
 the total amount of said at least one polyisoprene resin and/or at least one polyisobutylene resin (B) and said at least one epoxy resin (D) present in said resin composition is 0.1 mass % to 50 mass %, relative to 100 mass % of non-volatile components of said resin composition.

2. A resin composition according to claim 1, wherein said functional group of said (B) is an acid anhydride group.

3. A resin composition according to claim 1, wherein said (A) a polyisobutylene resin is a copolymer wherein a segment backbone comprised of a monomer component other than isobutylene is copolymerized with an isobutylene polymer and/or a polyisobutylene backbone.

4. A resin composition according to claim 1, wherein said (A) a polyisobutylene resin is a copolymer wherein a segment backbone comprised of a monomer component of styrene is copolymerized with a polyisobutylene backbone.

5. A resin composition according to claim 1, further comprising:
 (E) at least one liquid polyisobutylene and/or liquid polyisoprene.

6. A resin composition according to claim 1, further comprising:
 (F) at least one inorganic filler.

7. A resin composition according to claim 1, further comprising:
 (G) at least one hygroscopic metal oxide.

8. A resin composition according to claim 1, further comprising:
 (H) at least one curing agent.

9. A resin composition according to claim 1, wherein:
 the ratio of equivalents of epoxy groups in said at least one epoxy resin (D) to equivalents of functional groups in said at least one polyisoprene resin and/or at least one polyisobutylene resin (B) is 1:0.5 to 1:1.5;
 the mass ratio of said at least one epoxy resin (D) to said at least one polyisoprene resin and/or at least one polyisobutylene resin is 1:3 to 1:5; and
 the total amount of said at least one polyisoprene resin and/or at least one polyisobutylene resin (B) and said at least one epoxy resin (D) present in said resin composition is 1 mass % to 20 mass %, relative to 100 mass % of non-volatile components of said resin composition.

10. A resin composition according to claim 1, wherein:
 the ratio of equivalents of epoxy groups in said at least one epoxy resin (D) to equivalents of functional groups in said at least one polyisoprene resin and/or at least one polyisobutylene resin (B) is 1:0.5 to 1:1.5;
 the mass ratio of said at least one epoxy resin (D) to said at least one polyisoprene resin and/or at least one polyisobutylene resin is 1:3 to 1:4; and the total amount of said at least one polyisoprene resin and/or at least one polyisobutylene resin (B) and said at least one epoxy resin (D) present in said resin composition is 2 mass % to 17 mass %, relative to 100 mass % of non-volatile components of said resin composition.

11. A resin composition according to claim 1, wherein:
the ratio of equivalents of epoxy groups in said at least one epoxy resin (D) to equivalents of functional groups in said at least one polyisoprene resin and/or at least one polyisobutylene resin (B) is 1:0.5 to 1:1.5;
the mass ratio of said at least one epoxy resin (D) to said at least one polyisoprene resin and/or at least one polyisobutylene resin is 1:3 to 1:4; and
the total amount of said at least one polyisoprene resin and/or at least one polyisobutylene resin (B) and said at least one epoxy resin (D) present in said resin composition is 3 mass % to 14 mass %, relative to 100 mass % of non-volatile components of said resin composition.

12. A resin composition sheet, comprising a resin composition according to claim 1.

13. A resin composition sheet according to claim 12, wherein said resin composition is cured.

14. A resin composition sheet according to claim 12, wherein said resin composition is coated on a support film.

15. A resin composition sheet according to claim 14, wherein said resin composition is cured.

16. An organic light emitting diode device, comprising a resin composition sheet according to claim 12.

17. A method for producing an organic light emitting diode device, comprising
(a) curing a resin composition sheet according to claim 12, to obtain a cured resin sheet; and
(b) laminating said cured resin sheet on a substrate.

* * * * *